UNITED STATES PATENT OFFICE.

H. W. BRADLEY, OF BINGHAMTON, NEW YORK.

IMPROVED PAINT COMPOUND.

Specification forming part of Letters Patent No. 79,196, dated June 23, 1868.

*To all whom it may concern:*

Be it known that I, H. W. BRADLEY, of the town of Binghamton, in the county of Broome and State of New York, have invented a new and Improved Enamel Paint; and that the following is a full and complete specification of the same, wherein I have set forth the nature and principle of my said invention, by which it may be distinguished from all others of a similar class, together with what I claim and desire to secure by Letters Patent.

The present invention relates to a new and improved process and composition of materials to be used in combination with the oxide of lead, zinc, or other pigment or pigments for the production of a paint that, in all respects, is most superior and most durable and glossy.

In the manufacture of my improved paint the following ingredients, in and about the proportions stated, are used, viz: Three gallons water; two pounds arsenic powder; ten pounds sulphide zinc; one gallon of vinegar; two pounds litharge; one-fourth pound borax; one-half pound acetate or nitrate of lead; one pound glue; one-half gallon tannin, or a decoction of white-oak bark; six gallons linseed or other suitable oil; one and a half gallon spirits of turpentine.

The several materials above named are treated and combined together as and in the following manner: In one vat or other suitable receiving-vessel (which vessel I prefer should be heated in any suitable manner by means of steam, although other modes of heating might be adopted, and, therefore, I do not intend to limit myself to the use of steam only as a heating medium) the three gallons of water are first placed, when, having heated such water, the two pounds of arsenic powder and ten pounds of sulphide zinc are then placed therein, both of which become dissolved in the said water. In another vat or other suitable receiving-vessel the one gallon of vinegar is placed and heated, as before stated for the water in the first vat, when the two pounds of litharge are added, and the whole heated and agitated for forty-eight hours, more or less, after which the one-fourth pound of borax, one-half pound of acetate or nitrate of lead, and the one pound of glue, previously soaked or softened, are added.

Into the vat first referred to as having received the water, arsenic powder, and sulphide zinc, the one-half gallon of tannin, or a decoction of white-oak bark, is then placed; when, drawing off the contents of such vat into the other and remaining vat, containing the vinegar, litharge, borax, acetate or nitrate of lead, and glue, to the whole is then added the six gallons of oil and the one and a half gallon of spirits of turpentine, when the mixture is ready for use, and for being combined with the oxide of lead or zinc, or other pigment or pigments, as the case may be, in the proportion, or thereabout, of fifty pounds of the latter to the whole amount of the mixture produced as hereinabove described, when, for a proper length of time—say, fourteen to twenty-one days—the whole is then heated, and while being heated agitated, after which a most superior, durable, glossy, and enamel paint is obtained, which, for convenience of designation and for the trade, I intend to denominate the "Steam-Rendered Enamel Paint."

Having thus described my invention, what I claim is—

A paint produced by combining the oxide of lead or zinc, or other pigment or pigments, with the materials hereinbefore named, mixed and treated in or about the proportions and substantially in the manner described, for the purpose specified.

H. W. BRADLEY.

Witnesses:
H. P. BROWN,
J. K. WELDEN.